UNITED STATES PATENT OFFICE.

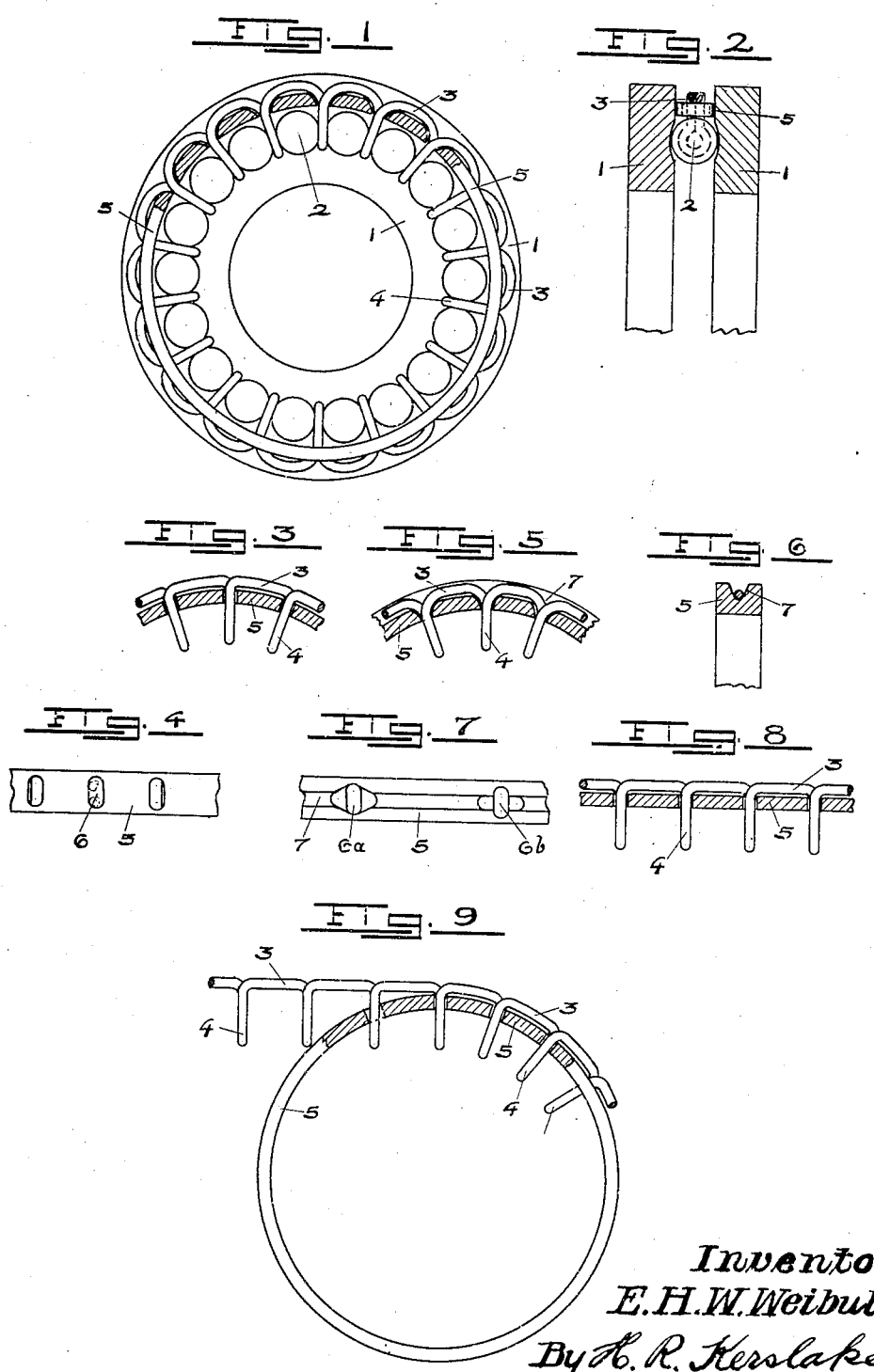

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

BALL-BEARING CAGE.

1,354,863.  Specification of Letters Patent.  Patented Oct. 5, 1920.

Application filed September 8, 1919. Serial No. 322,526.

*To all whom it may concern:*

Be it known that I, ERNST HJALMAR WALODDI WEIBULL, a subject of the King of Sweden, residing at Gottenborg, in the county of Gottenborg and Bohus and Kingdom of Sweden, have invented new and useful Improvements in Ball-Bearing Cages, of which the following is a specification.

Ball-cages of bent wire have been previously used in radial and axial ball bearings and the advantages thereof consist in the provision of a greater number of balls in the bearing than is possible with other types of ball cages. In the axial or thrust bearings, however, the balls by the centrifugal action are forced outwardly toward the plain or intermediate portions of the wire cage thereby exposing the cage to a stretching strain while the tension between the annular ball journaling portions ceases causing a likelihood of the escape of the balls from the bearing. In addition if a ball is broken the pieces thereof would be thrown past the rather restricted stopper, formed by the comparatively thin wire and enter adjacent toothed wheels or other similar moving parts, causing damage, when the ball bearing for instance issued in speed gears such as in motor cars and the like.

This invention has for its object to remove these inconveniences and principally consists of the provision of a guard ring positioned outside of the balls and the intermediate portions of the wire cage including briefly a metal strip with openings through which the annular ball journaling portions of the ball-cage are inserted so that when the balls are forced toward the guard ring on account of the centrifugal action, such action will be taken up by the ring and not by the wire cage proper. Moreover the ring is made of such a width that it practically fills up the whole space between the two race rings of the bearing and thereby prevents the pieces from any broken balls to be thrown out from the bearing. The method for the manufacture of the guard ring and its applying in connection with the wire-cage may be varied without interfering with the scope of this invention.

The invention is clearly illustrated in the accompanying drawings, in which:—

Figure 1 is a side view of a thrust ball bearing with one race ring removed and a portion of the guard ring in section.

Fig. 2 is an enlarged transverse section view through the bearing as shown in Fig. 1.

Fig. 3 is a side view partly in section, of a portion of a ball cage with a somewhat modified embodiment of the guard ring.

Fig. 4 is a side view of the same embodiment of the guard ring.

Fig. 5 shows a third embodiment of the guard ring in section.

Fig. 6 is a transverse sectional view of the embodiment shown in Fig. 5.

Fig. 7, is a plan view of a portion of the embodiment of the guard ring, shown in Fig. 5, illustrating one form of opening for inserting the annular journaling portions of the wire ball-cage.

Fig. 8 is a similar view illustrating an opening, of another shape.

Fig. 9 is a fragmentary detail of the improved device according to one method of manufacture.

Referring now, more particuarly, to the accompanying drawings there is provided a pair of race rings 1 between which balls 2 are provided and supported by the circumferential alining annular journaling portions 4 of the wire-cage. Round the row of balls 2 there is provided a closed metal guard ring 5 provided with openings 6, through which the annular portions 4 of the wire-cage are inserted. According to the embodiment, shown in Figs. 1 and 2, the intermediate portions 3 of the wire cage, which are provided between the portions 4, are curved and the edges of the openings or holes 6 in the ring 5 are beveled in order to accommodate the wire-cage. Fig. 3 shows an embodiment of the invention wherein the intermediate portions 3 of the cage are somewhat flattened so that the wire will lie snugly along the outer surface of the ring 5. According to Fig. 4 the holes or openings 6 are designed as axially oblong openings. On the outer surface of the ring 5 there is also provided a circumferential groove in which the intermediate portions 3 of the wire-cage lie, so that no portions of the wire-cage project beyond the outer surface of the ring 5. In this embodiment the edges of the openings 6 are beveled so that they assume the shape illustrated for example by the openings 6ª in Fig. 7 or 6ᵇ in Fig. 8.

The mounting of the guard ring 5 on the wire cage may be accomplished in different ways. According to one method of manufacture the openings 6 of any desired shape are provided in a straight metal strip and the annular portions 4 of the helicoil wire are inserted into these openings 6 (Fig. 9) after which the metal strip and the wire-cage proper are annularly bent until the ends meet, said ends being subsequently soldered or joined together in any other suitable way. According to another method of manufacture the ring 5 is cut off from a tube of suitable diameter and in which the openings 6 may be formed either before or after the ring is cut while subsequently the wire-cage is wound around the ring in such manner that the annular journaling portions 4 are successively inserted into their respective openings 6, and when completed the ends of wire-cage are joined together as previously stated.

The width of the guard ring 5 should be but slightly narrower than the free space between the race rings 1 in order to prevent accidentally broken balls from being thrown from the bearing into the adjacent toothed wheels or movable parts of the machine (not shown) with which the bearing is associated.

It is believed that in view of the foregoing that further detailed description of the operation of the invention is entirely unnecessary, likewise it is believed that the advantages of the invention will be readily apparent.

Having thus fully described the invention what is claimed and desired to be secured by Letters Patent is:—

1. In a thrust bearing the combination with a pair of race rings, a plurality of balls therebetween and a wire ball cage positioned between the rings and associated with the balls, of a metal guard ring provided with suitably spaced openings for accommodating portions of the ball cage and positioned between the race rings and between the balls and the ball cage.

2. An improved thrust bearing comprising a pair of race rings, a plurality of balls therebetween, a wire cage formed with a plurality of circumferentially arranged and uniformly spaced ball journaling portions, and with intermediate portions between the journaling portions, and a guard ring positioned between the race rings and around and between the balls and the intermediate portions of the wire-cage and provided with openings through which the annular journaling portions of the wire-cage are inserted, as and for the purpose set forth.

3. In an improved ball-cage as claimed in claim 2 wherein the outer surface of guard ring is provided with a circumferential groove to receive the intermediate portions of the wire-cage.

4. An improved ball-cage as claimed in claim 2 wherein the width of the guard ring is but slightly narrower than the distance between the race rings.

In testimony whereof I have affixed my signature.

ERNST HJALMAR WALODDI WEIBULL.